(12) United States Patent
Kirwan et al.

(10) Patent No.: US 9,999,846 B2
(45) Date of Patent: *Jun. 19, 2018

(54) DEFOAMING COMPOSITIONS COMPRISING AMPHIPHILIC PARTICLES AND METHODS OF MAKING AND USING THE SAME

(71) Applicant: Kemira Oyj, Helsinki (FI)

(72) Inventors: Carter Kirwan, Atlanta, GA (US); Rebecca Hamm, Marietta, GA (US)

(73) Assignee: Kemira Oyj, Helsinki (FI)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/973,808

(22) Filed: Dec. 18, 2015

(65) Prior Publication Data

US 2016/0175741 A1    Jun. 23, 2016

Related U.S. Application Data

(60) Provisional application No. 62/094,173, filed on Dec. 19, 2014.

(51) Int. Cl.
*B01D 19/04* (2006.01)
*D21C 3/28* (2006.01)
*D21H 21/12* (2006.01)
*D21H 17/13* (2006.01)

(52) U.S. Cl.
CPC .......... *B01D 19/0409* (2013.01); *D21C 3/28* (2013.01); *D21H 17/13* (2013.01); *D21H 21/12* (2013.01)

(58) Field of Classification Search
CPC . B01D 19/0409; B01D 19/0404; C08L 83/06; C08L 83/04; C11D 3/0026
See application file for complete search history.

(56) References Cited

U.S. PATENT DOCUMENTS

| 3,215,635 | A | | 11/1965 | Liebling | |
|---|---|---|---|---|---|
| 5,152,925 | A | | 10/1992 | Furman | |
| 5,916,090 | A | * | 6/1999 | Itagaki | B01D 19/0409 516/117 |
| 8,653,214 | B2 | * | 2/2014 | Venzmer | C08F 283/12 526/279 |
| 2003/0134093 | A1 | * | 7/2003 | Kitamura | B41M 5/5227 428/195.1 |

(Continued)

FOREIGN PATENT DOCUMENTS

JP    2011218304 A  * 11/2011

OTHER PUBLICATIONS

Translation of JP 2011-218304 to Ohama. Obtained from AIPN/JPO website on May 24, 2017.*

(Continued)

*Primary Examiner* — Michael A Salvitti
(74) *Attorney, Agent, or Firm* — Berggren LLP (57) ABSTRACT

Disclosed herein are methods of defoaming industrial process streams, the methods comprising adding to the industrial process stream an emulsion stabilized by Janus particles, wherein the Janus particles comprise at least one hydrophobic surface and at least one hydrophilic surface, and wherein the emulsion comprises silicone emulsion droplets in a continuous aqueous phase. Also disclosed herein are defoamer compositions comprising Janus particles and methods of making such compositions.

6 Claims, 3 Drawing Sheets

(56) References Cited

U.S. PATENT DOCUMENTS

| | | | |
|---|---|---|---|
| 2005/0109675 A1* | 5/2005 | Kremer | B01D 19/0409 208/131 |
| 2005/0227903 A1* | 10/2005 | Creutz | B01D 19/0404 510/511 |
| 2005/0239908 A1* | 10/2005 | Creutz | B01D 19/0404 516/117 |
| 2006/0128816 A1* | 6/2006 | Cheng | B01D 19/0404 516/56 |
| 2007/0167346 A1* | 7/2007 | Creutz | C11D 3/124 510/511 |
| 2007/0276056 A1* | 11/2007 | Delbrassinne | B01D 19/0404 521/122 |
| 2008/0234394 A1* | 9/2008 | Hong | B01J 13/00 516/22 |
| 2009/0149573 A1* | 6/2009 | Venzmer | C08F 283/12 523/201 |
| 2009/0252691 A1* | 10/2009 | Gartstein | A61K 8/11 424/49 |
| 2010/0305219 A1* | 12/2010 | Granick | B01F 17/00 516/111 |
| 2013/0327364 A1* | 12/2013 | Delbrassinne | C11D 3/0026 134/26 |
| 2014/0024571 A1* | 1/2014 | Creutz | B01D 19/0409 510/347 |
| 2014/0352076 A1* | 12/2014 | Song | C11D 3/0026 8/137 |
| 2015/0038388 A1* | 2/2015 | Gallez | C11D 3/0026 510/122 |
| 2016/0177225 A1* | 6/2016 | Colson | B01F 17/0071 510/466 |
| 2016/0184740 A1* | 6/2016 | Wilson | B01D 19/0409 516/121 |
| 2017/0218307 A1* | 8/2017 | Panandiker | C11D 3/0094 |

OTHER PUBLICATIONS

Höfer, Rainer et al, "Foams and Foam Control", Ullmann's Encyclopedia of Industrial Chemistry, 2000, Wiley-VCH, Weinheim.

Hubbe, Martin, "Mini-Encyclopedia of Papermaking Wet-End Chemistry", NC State University, http://www4.ncsu.edu/~hubbe/MiniEncy.htm, accessed Dec. 7, 2014.

He, Jie et al, "One-pot facile synthesis of Janus particles with tailored shape and functionality", Chem. Commun., 2011, 47, 12450-12452.

Binks, Bernard P., "Particles as surfactants—similarities and differences", Current Opinion in Colloid & Interface Science 7 (2002) 21-41, Elsevier Science Ltd.

IUPAC, Compedium of Chemical Terminology: Gold Book, Version 2.3.3, Feb. 24, 2014.

Schwartz, Anthony M. et al., "Surface active agents: Their chemistry and technology", vol. I (1949), pp. 414-423, Interscience Publishers, Inc., New York.

Schwartz, Anthony M. et al., "Surface active agents and detergents", vol. II (1958), pp. 664-669, Interscience Publishers, Inc., New York.

* cited by examiner

DEFOAMING COMPOSITIONS COMPRISING AMPHIPHILIC PARTICLES AND METHODS OF MAKING AND USING THE SAME

PRIORITY

This application claims priority of U.S. provisional application No. 62/094,173 filed on Dec. 19, 2014, the contents of which are incorporated herein by reference in its entirety.

FIELD OF THE INVENTION

The present invention relates to the use of amphiphilic particles (a/k/a Janus particles) to stabilize and/or enhance the performance of silicone emulsion defoaming compositions, and to methods of making and using silicone emulsion defoaming compositions stabilized by these amphiphilic particles.

BACKGROUND

Foaming is a common problem in many industrial processes, particularly in paper making operations where foam can prevent proper formation of the finished paper and disrupt manufacturing operations. Defoamers, sometimes called anti-foaming agents, can be added to process streams to combat this problem. Commonly used agents are insoluble oils, polydimethylsiloxanes and other silicones, certain alcohols, stearates and glycols. The defoamer can be added either to prevent formation of foam or to break a foam already formed. Rainer Höfer et al., "Foams and Foam Control," Ullmann's Encyclopedia of Industrial Chemistry, 2000, Wiley-VCH, Weinheim.

Generally a defoamer is insoluble in the industrial process stream to which it is added. Defoamers typically have a low viscosity, surface-active properties, and the ability to spread rapidly on foamy surfaces. They also have affinity for the air-liquid surface where they destabilize the foam lamellas. This causes the air bubbles to rupture and the surface foam to break down. Entrained air bubbles agglomerate, and the larger bubbles rise to the surface of the bulk liquid more quickly. Martin Hubbe, NC State University. "Mini-Encyclopedia of Papermaking Wet-End Chemistry." Accessed Dec. 7, 2014.

Experiments with silicone-based defoamers started during the 1950s. These were based on polydimethylsiloxane (silicone oil) dispersed in water or light oil. Silicone oils worked well, but caused surface disturbances in many applications like paints and papermaking. In 1963, the first defoamers made with hydrophobic silica particles in light oil were patented, including dispersions of silica particles in silicone oil (so-called "filled silicone"). These eventually were replaced by water-based defoamers, and today the predominant defoamers in the paper-making industry use filled silicone present as an oil-in-water emulsion.

Surfactants are commonly used to stabilize these silicone-in-water emulsions and thereby prevent them from separating into two liquid phases. The surfactants both stabilize the emulsion, and participate in the defoaming process by facilitating the spread of the defoaming agent at the air-liquid interface.

The manufacture of silicone-based defoamers is a time and heat intensive process, primarily because of the need to melt the surfactants and other defoamer ingredients before forming an emulsion. What is needed are improved techniques and compositions for manufacturing silicone emulsion defoamer compositions that require less time and use less energy for production. Ideally, the resulting emulsion would have improved anti-foaming activity, improved finished product performance, and improved activity in the process stream to which it is added.

SUMMARY OF THE INVENTION

It has surprisingly been discovered that amphiphilic particles, i.e. so-called Janus particles, with hydrophobic and hydrophilic surfaces, such as those described in U.S. Patent Publication No. 2008/0234394 A1 to Hong et al., can be used instead of surfactants to stabilize silicone-in-water emulsions, and that silicone-in-water emulsions stabilized by Janus particles perform better in defoaming applications than silicone-in-water emulsions stabilized by surfactants in terms of foam knock-down and longevity of performance. While the use of Janus particles to stabilize emulsions is known from U.S. Patent Publication No. 2010/0305219 A1 of Granick et al., Janus particles have not previously been used in defoaming compositions, or as a substitute for the surfactants most commonly used to stabilize silicone-in-water defoamer emulsions.

Therefore, in a first principal embodiment the invention provides a method of defoaming an industrial process stream comprising adding to the industrial process stream a silicone-in-water emulsion stabilized by Janus particles in an amount effective to defoam the stream, or to prevent foaming in the stream, wherein: (a) the amphiphilic particles comprise at least one hydrophobic surface and at least one hydrophilic surface, and (2) the emulsion comprises silicone emulsion droplets in a continuous aqueous phase.

A second principal embodiment describes the defoamer compositions themselves, and in this embodiment the invention provides a silicone-in-water emulsion defoamer composition comprising: (a) water and silicone emulsion droplets in a weight ratio of from about 1:7 to about 1:3; and (b) an emulsion stabilizing amount of amphiphilic particles comprising at least one hydrophobic surface and at least one hydrophilic surface.

It has also unexpectedly been discovered that replacing the surfactant in silicone-in-water emulsions with Janus particles can substantially reduce the energy and heat required to make the emulsion, particularly when the Janus particles are added to the water/aqueous phase prior to forming the emulsion. Therefore, a third principal embodiment provides a method of making a stabilized silicone-in-water emulsion defoamer composition comprising: (a) mixing water with amphiphilic particles comprising at least one hydrophobic surface and at least one hydrophilic surface to form an aqueous phase; (b) mixing the aqueous phase with a silicone composition; and (c) emulsifying the silicone composition in the aqueous phase as emulsion droplets to form the emulsion.

Additional advantages of the invention are set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Definitions and Use of Terms

Ratios, quantities and rates of liquid flows expressed herein, unless otherwise specified, are expressed in terms of volume, and are preferably measured at room temperature (25° C.) and atmospheric pressure.

When the singular forms "a," "an," and "the" or like terms are used herein, they will be understood to include plural referents unless the context clearly dictates otherwise. Thus, for example, reference to "a hydrocarbon" includes mixtures of two or more such hydrocarbons, and the like. The word "or" or like terms as used herein means any one member of a particular list and also includes any combination of members of that list.

Throughout the description and claims, whenever a specific value is given it will be understood that the value includes values approximating the recited value, as if the value were modified by the term "about." In like manner, when the term "about" is used to refer to a specific value, the disclosure will be understood to include reference to the specific value without modification by the term about.

Throughout the description and claims of this specification, the word "comprise" and variations of the word, such as "comprising" and "comprises," means "including but not limited to," and is not intended to exclude, for example, other additives, components, integers or steps.

When ranges are given by specifying the lower end of a range separately from the upper end of the range, it will be understood that the range can be defined by selectively combining any one of the lower end variables with any one of the upper end variables that is mathematically possible.

The invention is defined in terms of three principal embodiments. When an embodiment or subembodiment other than the principal embodiment is discussed herein, it will be understood that the embodiment or subembodiment can be applied to further limit any three of the principal embodiments.

Discussion

It has surprisingly been discovered that amphiphilic particles, i.e. Janus particles, with hydrophobic and hydrophilic surfaces, such as those described in U.S. Patent Publication No. 2008/0234394 A1 to Hong et al., can be used instead of surfactants to stabilize silicone-in-water emulsions, and that these emulsions perform better as defoamers than emulsions stabilized by surfactants. In a first principal embodiment the invention provides a method of defoaming an industrial process stream comprising adding to the industrial process stream a silicone-in-water emulsion stabilized by Janus particles in an amount effective to defoam the stream, or to prevent foaming in the stream, wherein: (a) the Janus particles comprise at least one hydrophobic surface and at least one hydrophilic surface, and (2) the emulsion comprises silicone emulsion droplets in a continuous aqueous phase.

A second principal embodiment is directed toward the defoamer compositions themselves, and in this embodiment the invention provides a silicone-in-water emulsion defoamer composition comprising: (a) water and silicone emulsion droplets in a weight ratio of from about 1:7 to about 1:3; and (b) an emulsion stabilizing amount of Janus particles comprising at least one hydrophobic surface and at least one hydrophilic surface. The emulsion preferably lacks a surfactant entirely, but when a surfactant is present is it preferably not present in an amount that is effective to stabilize the emulsion in the absence of the Janus particles. For example, the surfactant would usually not be present in an amount greater than 1.0 or 0.5 or 0.2% based on the weight of the emulsion. In some embodiments, the defoamer compositions perform from about 20% to about 50% better in the Foam and Entrained Air Test than standard defoamer compositions that use surfactants to stabilize the emulsion.

A third principal embodiment is directed toward the method of forming a silicone-in-water defoamer emulsion using Janus particles, comprising: (a) mixing water with Janus particles comprising at least one hydrophobic surface and at least one hydrophilic surface to form an aqueous phase; (b) mixing the aqueous phase with a silicone composition; and (c) emulsifying the silicone composition in the aqueous phase as emulsion droplets to form the emulsion. The method can advantageously be completed in certain embodiments in 30 minutes or less (including 15 minutes or less), and can also be completed without the addition of heat during the mixing or emulsifying steps.

Janus Particles

Figure 1:
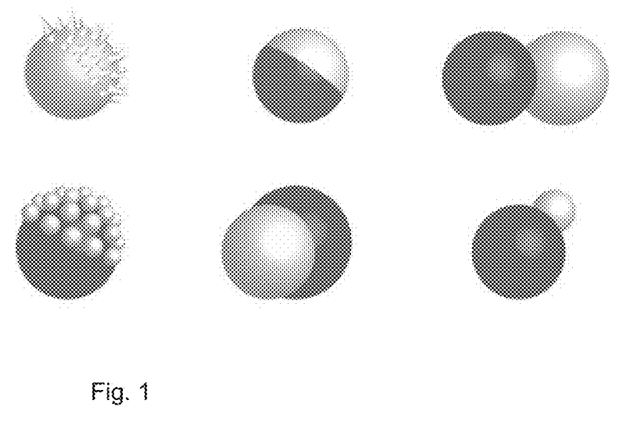
FIG. 1 is a series of drawings depicting exemplary Janus particle configurations.

Janus particles useful in the present invention are colloidal particles having two compartments with different chemistry and/or polarity on their surface. They can also be called "amphiphilic" particles, because they are typically hydrophobic on one surface and hydrophilic on another. Commercially available Janus particles can be purchased from Evonik Degussa GmbH, Essen, Germany. The Janus particles can be present in a variety of shapes including spherical, ellipsoid, helical, rodlike, oblate, and combinations thereof. FIG. 1 depicts several potential configurations.

Janus particles may be formed from any suitable composition known in the art, including polymers (for example, polystyrene, polypropylene, latex, polyacrylamide), polypeptides, proteins, nucleic acids, glass (for example, fused silica), ceramics (for example, $TiO_2$, $Al_2O_3$, $ZrO_2$), metals (for example, gold, silver, platinum, palladium or alloys), and chemical elements (for example, tungsten, titanium, carbon, etc.). In some embodiments, the Janus particles comprise silica, preferably fused silica.

Methods of manufacturing Janus particles are well known in the art as described, for example, in U.S. Patent Publication No. 2008/0234394 A1 to Hong et al. ("Hong"), He et al., "One-pot facile synthesis of Janus particles with tailored shape and functionality," Chem. Commun., 2011, 47, 12450-12452, and Binks, "Particles as Surfactants—Similarities and Differences," Current Opinion in Colloid & Interface Science 7 (2002) 21-41. Among other methods, they may be made by coating the surfaces of an inert material with hydrophobic and hydrophilic materials, or they may be made by coating one surface of a hydrophilic substrate with a hydrophobic material, or vice versa.

The Janus particles are present in the emulsion in an amount sufficient to stabilize the emulsion and preferably to facilitate defoaming. In some embodiments, the Janus particles are present in the emulsion in an amount of greater than about 0.5%, 1%, 1.5%, 2%, 2.5%, 3%, 3.5%, 4%, 4.5%, or even 5%, by weight of the emulsion, and/or less than about 10%, 8%, 7.5%, 7.0%, 6.5%, 5.5%, 5.0%, 4.5%, 4.0%, 3.5%, 3.0%, or 2.5%. The Janus particles are preferably present in an amount of from about 1% to about 3.5%, most preferably from about 1.5% to about 2.5%, by weight of the emulsion.

The size of the Janus particles can be chosen for a variety of reasons, including but not limited to cost, mechanical properties, defoaming properties, emulsion stabilizing properties, regulatory issues, or a combination thereof. The average particle size of the Janus particles is usually greater than about 0.1 µm, 0.5 µm, 1 µm, 3 µm or 5.0 µm, and/or less than about 50 µm, 20 µm, 10 µm, 7.5 µm, or 5.0 µm. In the silicone emulsion defoaming compositions of the present invention, the average particle size usually ranges from about 1 µm to about 5 µm. The average particle size is determined using a laser diffraction particle size analyzer such as from Horiba International Corporation.

The term "Janus angle" refers to the three-phase contact angle formed between a particle and the liquid-liquid interface formed between a first liquid and a second liquid, as described in U.S. Patent Publication 2010/0305219 A1 of Granick et al. The Janus angle of a particle is determined by removing at least a portion of the particles from solid colloidosomes, imaging the resultant solid colloidosomes with scanning electron microscopy (SEM), and measuring the three-phase contact angle of the voids left by the removed particles. A plurality of individual three-phase contact angles may be measured for one or more colloidosomes, and an averaged, three-phase contact angle determined by calculation. The Janus particles can be selected or designed to have any Janus angle that stabilizes the emulsion or facilitates defoaming, but preferably have a Janus angle of from about 80 to about 100 degrees, and most preferably have a Janus angle of about 90 degrees.

The term "Janus balance" refers to the percentage of the total contiguous surface area of a particle that contacts a first liquid in a liquid-liquid interface. For example, a particle having a Janus balance of 25% has 25% of the surface area of the particle in contact with a first liquid and the remaining 75% of the surface area of the particle exposed to or in contact with a second liquid. The Janus particles can be selected or designed to have any Janus balance that stabilizes the emulsion or facilitates defoaming, but will typically range from about 25%, 35% or 45%, to about 75%, 65%, or 55%.

Silicone Emulsion Droplets in a Continuous Aqueous Phase

The emulsions of the present invention comprise silicone emulsion droplets in a continuous aqueous phase. The term "emulsion" refers to a combination of at least two liquids, where one of the liquids is present in the form of droplets in the other liquid. See, IUPAC, *Compendium of Chemical Terminology: IUPAC Recommendations,* 2ded., compiled by A. D. McNaught and A. Wilkinson, Blackwell, Oxford (1997).

The emulsion can be defined by its viscosity, and in various embodiments the emulsion has a viscosity at 25° C. of about 500 cS or greater (including about 1000 cS or greater, about 1500 cS or greater, about 2000 cS or greater, about 2500 cS or greater, about 3000 cS or greater, about 3500 cS or greater, about 4000 cS or greater, about 4500 cS or greater, about 5000 cS or greater, or about 5500 cS or greater). As an upper bound, the emulsion usually has a viscosity at 25° C. of about 6000 cS or less (including about 5500 cS or less, about 5000 cS or less, about 4500 cS or less, about 4000 cS or less, about 3500 cS or less, about 3000 cS or less, about 2500 cS or less, about 2000 cS or less, about 1500 cS or less, or about 1000 cS or less). In some embodiments, the emulsion has a viscosity at 25° C. of from about 500 cS to about 6000 cS, which includes ranges of from about 500 cS to about 1000 cS, from about 1000 cS to about 1500 cS, from about 1500 cS to about 2000 cS, from about 2000 cS to about 2500 cS, from about 2500 cS to about 3000 cS, from about 3000 cS to about 3500 cS, from about 3500 cS to about 4000 cS, from about 4000 cS to about 4500 cS, from about 4500 cS to about 5000 cS, from about 5000 cS to about 5500 cS, from about 5500 cS to about 6000 cS, from about 500 cS to about 2000 cS, from about 2000 cS to about 4000 cS, from about 4000 cS to about 6000 cS, from about 500 cS to about 3500 cS, from about 2500 cS to about 3500 cS, or from about 3500 cS to about 6000 cS.

The emulsion can comprise water and silicone emulsion droplets in any weight ratio that facilitates defoaming. The water and silicone emulsion droplets are usually provided in a weight ratio (silicone:water) of about 1:7 or greater (including about 1:6.5 or greater, about 1:6 or greater, about 1:5.5 or greater, about 1:5 or greater, about 1:4.5 or greater, about 1:4 or greater, or about 1:3.5 or greater). As an upper bound, the water and silicone emulsion droplets are usually provided in a weight ratio (silicone:water) of about 1:2 or less (including about 1:3 or less, about 1:3.5 or less, about 1:4 or less, about 1:4.5 or less, about 1:5 or less, about 1:5.5 or less, about 1:6 or less, or about 1:6.5 or less). Weight ratios are from about 1:7 to about 1:2 (including from about 1:7 to about 1:6, from about 1:6 to about 1:5, from about 1:5 to about 1:4, from about 1:4 to about 1:2, from about 1:7 to about 1:5, from about 1:6 to about 1:4, or from about 1:5 to about 1:2).

A conventional silicone emulsion includes a dispersion of treated silica (hydrophobic) in siloxane, commonly referred to as "filled silicone," in the emulsion droplets. The siloxane in this filled silicone can be a linear or branched dialkylsiloxane end-capped by alkyl, having a neat viscosity of from about 100 to about 1,000. The siloxane is preferably a linear dimethylsiloxane end capped by methyl.

The treated silica in the filled silicone is preferably hydrophobic, and preferably has an average particle size of from about 1 to about 30 microns, from about 5 to about 15 microns, or about 10 microns.

The filled silicone will usually include silicone and silica in a weight ratio of about 3:1 (silicone:silica) or greater (including about 4:1 or greater, about 5:1 or greater, about 6:1 or greater, about 7:1 or greater, about 8:1 or greater, or about 10:1 or greater). As an upper limit, the weight ratio of silicone to total silica in the filled silicone is usually about 20:1 or less (including about 15:1 or less, about 12:1 or less, or about 10:1 or less).

The filled silicone will usually include silicone and silica in a weight ratio (silicone:silica) of about 3:1 or greater (including about 4:1 or greater, about 5:1 or greater, about 6:1 or greater, about 7:1 or greater, about 8:1 or greater, or about 10:1 or greater). As an upper limit, the weight ratio of silicone to total silica in the filled silicone is usually about 20:1 or less (including about 15:1 or less, about 12:1 or less, or about 10:1 or less).

Silicone emulsions can also use high viscosity siloxanes, in addition to the filled silicone, to create the emulsion droplets. These high viscosity siloxanes are commonly added to improve the stability of the emulsion and to lengthen the activity of the defoamer when added to an industrial process stream. The high viscosity silicone can be any linear or branched dialkylsiloxane end-capped by alkyl, but is preferably a linear dimethylsiloxane end capped by methyl having a viscosity of from about 10,000 cS to about 100,000 cS. In various embodiments, the high viscosity silicone has a viscosity at 25° C. of about 10,000 cS or greater (including about 15,000 cS or greater, about 20,000 cS or greater, about 30,000 cS or greater, or about 35,000 cS or greater). As an upper bound, the high viscosity silicone usually has a viscosity at 25° C. of about 100,000 cS or less (including about 75,000 cS or less, about 50,000 cS or less, or about 45,000 cS or less). In some embodiments, the high viscosity silicone has a viscosity at 25° C. of from about 20,000 cS to about 40,000 cS (including about 20,000 cS to about 30,000 cS, about 25,000 cS to about 35,000 cS, or about 30,000 cS to about 40,000 cS).

When a high viscosity silicone is present, the emulsion will usually comprise filled silicone and high viscosity silicone in a weight ratio (high viscosity silicone:filled silicone) ranging from about 10:1 to about 2:1, or from about 5:1 to about 2.5:1. The total percentage of filled silicone and high viscosity silicone in the emulsion will usually be as follows:

filled silicone: 0.5% or greater, (including about 1.5% or greater, about 2% or greater, about 2.5% or greater, about 3% or greater, about 3.5% or greater, about 4% or greater, about 4.5% or greater, about 5% or greater, about 5.5% or greater, about 6% or greater, or about 6.5% or greater), by weight of the emulsion. As an upper bound, the filled silicone is usually present in the emulsion in an amount of about 10% or less (including about 7% or less, about 6.5% or less, about 6% or less, about 5.5% or less, about 5% or less, about 4.5% or less, about 4% or less, about 3.5% or less, about 3% or less, about 2.5% or less, or about 2% or less), by weight of the emulsion.

high viscosity silicone: about 10% or greater (including about 15% or greater, about 20% or greater, about 25% or greater, about 30% or greater, about 35% or greater), by weight of the emulsion. As an upper bound, the high viscosity silicone is usually present in the emulsion in an amount of about 40% or less (including about 35% or less, about 30% or less, about 25% or less, about 20% or less, about 15% or less), by weight of the emulsion. In some embodiments, the high viscosity silicone is present in an amount of from about 10% to about 40% (including about 10% to about 20%, about 20% to about 30%, about 30% to about 40%, about 10% to about 25%, about 25% to about 40%), by weight of the emulsion.

When the emulsion includes a high viscosity silicone, the emulsion will usually include silicone and silica (including the weight of silica from the Janus particles and the weight of the silica in the filled silicon) in a weight ratio (silicone:silica) of about 4:1 or greater (including about 5:1 or greater, about 6:1 or greater, about 7:1 or greater, about 8:1 or greater, or about 9:1 or greater). As an upper limit, the weight ratio of silicone to total silica in the emulsion is usually about 10:1 or less (including about 9:1 or less, about about 8:1 or less, or about 7:1 or less). In some embodiments, the weight ratio of silicone to silica in the emulsion is from about 4:1 to about 10:1 (including about 4:1 to about 7:1, about 5:1 to about 8:1, about 8:1 to about 9:1, about 9:1 to about 10:1, about 4:1 to about 8:1, about 5:1 to about 8:1, about 8:1 to about 10:1). In some embodiments, the emulsion has a weight ratio of silicone to total silica content of about 8:1.

Additives

The emulsion can also comprise various additives to enhance the performance of the defoamer (including emulsion stability, defoaming ability). The emulsion can further comprise a drainage enhancer, for example, as disclosed in U.S. Pat. No. 5,152,925 to Furman. In some embodiments, the drainage enhancer comprises hydroxyalkyl(meth)acrylate containing polymers, which are then solubilized in an organic carrier system. The drainage enhancer is usually present in the emulsion, if at all, in an amount of from about 0% to about 10%, by weight of the emulsion.

The emulsion can further comprise a corrosion inhibitor. In some embodiments, the corrosion inhibitor is a salt. Exemplary corrosion inhibitors include, but are not limited to, sodium nitrite and sodium phosphate. In some embodiments, the corrosion inhibitor comprises an alkali metal nitrate, an alkali metal nitrite, an alkali metal silicate or cyanate or urea, or sodium mercaptobenzthiazole or benztriazole, or a combination thereof. In some embodiments, the alkali metal is sodium. In some embodiments, the alkali metal is potassium. In some embodiments, the alkali metal silicate includes compounds having the formula $MO(SiO)n$ where M represents the alkali metal and n is greater than 1 (including from about 3 to about 3.3). In some embodiments, the corrosion inhibitor is sodium nitrite. The corrosion inhibitor is usually present in the emulsion, if at all, in an amount of from about 0% to about 2%, by weight of the emulsion.

The emulsion can further comprise a biocide. A biocide is an antimicrobial chemical substance that can deter, render harmless, or exert a controlling effect on any harmful organism. Examples of non-oxidizing biocides useful in the compositions of the present invention, particularly for use in the pulp and paper making processes, include, for instance, 2-bromo-2-nitropropane-1,3-diol, 5-chloro-2-methyl-4-isothiazolin-3-one, DBNPA, n-octyl-isothiazolin-3-one, MBT, quaternary ammonium compounds, THPS and glutaraldehyde. In one embodiment the biocide is selected from the group consisting of glutaraldehyde, 2,2-dibromo-3-nitrilopropionamide (DBNPA), 2-bromo-2-nitropropane-1,3-diol (Bronopol), 5-chloro-2-methyl-4-isothiazolin-3-one (CMIT), n-alkyl dimethyl benzyl ammonium chloride, didecyl dimethyl ammonium chloride (DDAC), alkenyl dimethylethyl ammonium chloride, tetrakis hydroxymethyl phosphonium sulfate (THPS). The biocide is usually present in the emulsion, if at all, in an amount of from about 0% to about 2%, by weight of the emulsion.

The emulsion can further comprise a surfactant (including an ionic surfactant or a nonionic surfactant), although not typically in an amount sufficient to stabilize the emulsion. Examples of ionic surfactants include cationic surfactants (for example, cetyltrimethyl-ammonium bromide (CTAB), hexadecyltrimethylammonium bromide (HTAB), dimethyldioctadecylammonium bromide (DDAB), and methylbenzethonium chloride (Hyamine™)) and anionic surfactants (for example, sodium dodecyl sulfate, sodium lauryl sulfate, lauryl dimethyl amine oxide, bile salts (such as sodium deoxycholate, sodium cholate)). Examples of nonionic surfactants include polysorbates (Tween™), polyethoxylated alcohols, polyoxyethylene sorbitan, octoxynol (Triton X100™), N, N-dimethyldodecyl-amine-N-oxide, Polyoxyl 10 lauryl ether, Brij 721™, nonylphenol ethoxylate (Tergitol™), cyclodextrins, lecithin, among others. A preferred non-ionic surfactant is Tween 20. An example ionic surfactant is a cationic surfactant, such as DDAB. In some embodiments, the emulsion lacks a surfactant in an amount effective to stabilize the emulsion in the absence of Janus particles. In some embodiments, the emulsion is substantially free of surfactants (including less than about 1% surfactants, less than about 0.5% surfactants, less than about 0.2% surfactants, by weight of the emulsion). In some of embodiments, the emulsion is free of surfactants (i.e., does not comprise surfactants).

Additional additives may also be included in the emulsion, including (but not limited to) buffering agents, acids, bases, salts, chaotropic agents, and the like. In some embodiments, the emulsion is substantially free of salt (including less than about 1% salt, less than about 0.5% salt, less than about 0.2% salt, by weight of the emulsion). In some of embodiments, the emulsion is free of salt (i.e., does not comprise salt). In some embodiments, the emulsion is substantially free of additives (including less than about 1% additives, less than about 0.5% additives, less than about 0.2% additives, by weight of the emulsion). In some of embodiments, the emulsion is free of additives (i.e., does not comprise additives).

Industrial Process Streams

The methods of the present invention can be practiced in any industrial process in which foaming is a concern, including process streams commonly encountered when processing or manufacturing wood pulp, paper, textiles, cement or paint, in addition to processes for treating industrial wastewater, food processing, and oil drilling. The methods can be used in practically any industrial water system where foaming is a problem, but are particularly well-adapted to recirculating water systems as found in papermaking systems, cooling water systems (including cooling towers, open and closed loop cooling units), industrial raw water systems, drinking water distribution systems, sanitizing drinking water system, oil production or recovery systems (oil field water system, drilling fluids), fuel storage system, metal working systems, heat exchangers, reactors, equipment used for storing and handling liquids, boilers and related steam generating units, radiators, flash evaporating units, refrigeration units, reverse osmosis equipment, gas scrubbing units, blast furnaces, sugar evaporating units, steam power plants, geothermal units, nuclear cooling units, water treatment units, pool recirculating units, mining circuits, closed loop heating units, machining fluids used in operations such as for example drilling, boring, milling, reaming, drawing, broaching, turning, cutting, sewing, grinding, thread cutting, shaping, spinning and rolling, hydraulic fluids, cooling fluids, and the like. In some embodiments, the industrial process stream is an industrial process stream in a cement-making process or a paint-making process.

In one embodiment the defoamer compositions and/or emulsions disclosed herein are added or dosed to a pulp and/or paper processing system. The composition can be generally utilized throughout the system to minimize and to prevent foam. In certain examples, the composition is added in a short loop of the system. Other examples of suitable addition points are large storage towers for process water (circulating water towers, filtrate water towers), clear or cloudy filtrate storage tanks, pulpers or process streams upstream/downstream of the pulpers, broke system or process streams upstream/downstream of vessels therein, wire pit process streams upstream/downstream of the pit, paper machine blend chest process streams upstream/downstream of the chest, fresh water tank, warm water tank and shower water tank. Suitable addition points for a pulp mill system include the digester, the brown stock stream, washers (such as the brown stock washer), the black liquor stream in a Kraft process, or the red or brown liquor in a sulfite process. The composition can be dosed continuously or periodically as a batch process. The composition can be fed for about 3 to about 45 minutes each about 6 to about 24 times a day, or for example for about 10 to about 30 minutes for about 12 to about 24 times a day.

Additional details about particular industrial processes are provided below for reference.

Paper-Making Processes

In the paper industry, the Kraft process is a frequently used alkaline pulping process. Spent chemicals in the process can be recycled and reused thus decreasing processing costs. A large disadvantage of this process is the occurrence of foam during the pulp screening and washing procedures.

The Kraft process (as taught in U.S. Pat. No. 3,215,635 to Liebling, for instance) first cooks the wood chips in digesters and then draws off the spent chemicals for reuse. The resulting pulp fibers are then washed free of a large amount of residual chemicals in brown stock washers. These washers are a series of vats usually three or four in number that alternatively dilute the pulp with water and thicken it by picking it up on large rotary screens. From the brown stock washers, the pulp travels to the screen room where it is again diluted with water and put through vibrating screens that accept the now completely delignified fibers and reject the clumps of unpulped fibers, knots, and other foreign material. Foam problems can be severe in the screen room, because the diluted pulp is subjected to violent agitation by the screens. The water removed from the pulp after the screening operations is referred to as the dilute black liquor and, for the sake of economy, is normally used as the dilution water for the third and fourth stage of the brown stock washers. The dilute black liquor is a foaming material, containing, for example, from about 0.001% to about 0.1% by weight of solids and having a pH of about 12. The foaming of the dilute black liquor increases along with the resin content of the wood used in this process.

Defoamers can be used in alkaline pulp mills during the screening operations so that a more efficient screening is accomplished and to prevent the pulp thickeners, used after the screening operations from becoming clogged with entrapped air. When water-dispersible defoamers are used during the screening operation, the control of foam and entrained air in the screening operation contributes to the washing efficiency of the pulp during the alkaline pulping process. This occurs because the screening efficiency of the pulp is increased, allowing ease of flow of the pulp throughout the thickeners and subsequent washers.

De-inking detergents used to de-ink paper in paper recycling operations can also cause significant defoaming problems. Detailed descriptions of such processes are found in standard textbooks, such as A. M. Schwartz and J. W. Perry, SURFACE ACTIVE AGENTS, Vol. I (1949); and SURFACE ACTIVE AGENTS AND DETERGENTS, Vol. II (1958), Interscience Publishers, New York, the descriptions of which are incorporated herein by reference.

The de-inking agents, in amounts ranging from about 0.3 to about 3 percent based on the weight of the paper, are used in solution in substantially aqueous media. The temperature of the de-inking solution can vary anywhere from room temperature, including about 40° F. to about 70° F. (about 4° C. to about 20° C.), up to about 200° F. (about 95° C.). The processes are generally performed at an alkaline pH (i.e. from about 7.0 and about 11.5). In general, the percent of cellulosic by weight of the aqueous de-inking solution should be below 10 percent and preferably below 6.0 percent, or between about 4.0 and 6.0 percent.

Following deinking treatment, the defibered material is dropped to a chest or other reservoir, after which it is diluted with water to a solids content of between about 0.5 and about 1.5 percent (including about 1.0 percent), based upon the solution weight. Following dilution, the pulp is separated from the solution and washed and thickened by well-known methods. Optionally, the pulp is then acidified to a pH of between about 4 and about 6.5 (including about 4.5 to about 5.5), thickened and then formed into a web. The recovered stock can be blended with fresh virgin sulfate or sulfite stock, or with additional recovered stock to make cellulosic articles, such as newspaper and so forth. The de-foamer can be added during any of the foregoing stages to control or prevent foam formation.

Cement-Making Processes

The reliable administration of defoaming chemistries is also a key step in preventing excessive foaming and avoiding operational difficulties due to entrained air in cementing applications. Most chemical additives needed to make cement slurries are surface active molecules with an amphiphilic structure; on one hand soluble and on the other insoluble (or of limited solubility) in aqueous phase. This surfactancy is responsible for the stabilization of air-liquid interfaces and the potential generation of excessive foam and air. Such additives include cement retarders, dispersants, fluid loss control additives, gas migration control agents and ductility improvement additives. Chemicals used to enhance cement grinding are also known to cause foaming to some extent.

Origins of air in cement slurries include air already contained in the system and air entrapped during mixing. It is clearly a complex process, which is affected by many factors such as the mixing regime, physical and chemical properties of oil well cements, water ratio and quality, dosage and properties of the foaming agent, other chemical additives and supplementary cementitious materials (SCMs), and a range of other parameters. The defoamers of the present invention can be added at any time during the cement making sequence. They can be added to the water or the cement powder before the water and powder are mixed, or they can be added to the wet cement after the water and powder have been mixed.

Textile-Making Processes

Defoamers are also employed in textile wet processing during scouring, desizing, bleaching and dyeing operations. The scouring, desizing and bleaching operations used in textile processing to remove foreign materials such as warp size, processing oil, dirt and natural waxes from the fabric, often use detergents that create foam. These operations are performed before dyeing to ensure a well-prepared substrate that will accept dye evenly.

Traditional defoamers re-deposit insoluble materials on the fabrics during processing. If the insoluble materials are not removed before dyeing they can create resist spots in the fabrics where the dye does not penetrate or in the case of some synthetic fibers, oil spots where the fabric will actually dye darker in that spot. The defoamers of the present invention do not have this problem. They defoam during the higher temperature part of the process that employs the foaming surfactants and are subsequently rinsed out at a later stage in the process at lower temperatures.

Textile dyeing processes also employ surfactants that foam as wetting agents and after scour agents to remove loose dye stuff. Foam must be controlled during the dyeing process with materials that do not redeposit on the fabrics. The defoamer compositions disclosed herein also have application during the dyeing process where the actual dyeing will take place at a higher temperature employing the disclosed defoamers, and then the goods will subsequently be rinsed clean at a lower temperature.

EXAMPLES

The following examples are put forth so as to provide those of ordinary skill in the art with a complete disclosure and description of how the methods claimed herein are made and evaluated, and are intended to be purely exemplary of the invention and are not intended to limit the scope of what the inventor regards as his invention. Efforts have been made to ensure accuracy with respect to numbers (e.g., amounts, temperature, etc.) but some errors and deviations should be accounted for.

Description of Samples

Inventive Example 1

An emulsion was prepared using a surfactant-free formulation, substituting Janus particles for the surfactant. This formulation included filled silicone (silicone with hydrophobic silica), specialty silicone, and a high viscosity silicone, salt, a drainage package, and biocides. The Janus particles (1.75%) (sold by Evonik Degussa GmbH, Essen, Germany under the AEROSIL mark) were added to the water before the emulsion was formed. This emulsion had 10 ingredients.

Inventive Example 2

An emulsion was prepared with no specialty silicones, surfactants, or salts. Instead, the emulsion included a traditional filled silicone concentrate. This emulsion also contained a drainage package and biocides. The Janus particles (2.3%) (sold by Evonik Degussa GmbH, Essen, Germany under the AEROSIL mark) were added to the water before the emulsion was formed. This emulsion had 7 ingredients.

The Janus particles in inventive Examples 1 & 2 serve as emulsion stabilizers, thus eliminating the need for surfactants. The Janus particles of Inventive Examples 1 and 2 are simple powders that incorporate well into water without the need for heat. In making the Janus emulsions of inventive Examples 1 and 2, the silicones, filled silicones, drainage package, and the water (including the Janus particles) were mixed. The water was added in one step to the silicone. The biocides were then added and the sample emulsified. The process from start to finish took approximately 15 minutes due to case of mixing, fewer raw materials, and elimination of the heating requirement.

Test Methods & Results

The emulsions of Inventive Examples 1 and 2 were tested against FENNOTECH® 6006, a well-tested, strong-performing silicone emulsion currently sold by Kemira Chemicals, in FEAT (Foam and Entrained Air Test). The FEAT test uses a column with a heated water jacket connected to a pump that continually circulates black liquor (or any other process stream sought to be tested) through a closed loop system and is monitored with a density meter. Air is introduced into the system and foam is created through the natural foaming tendency of the black liquor circulating through the system. The defoamer is injected into the system and the density of the circulating black liquor is measured every half second for a total of 200 seconds. The higher the density, the lower is the amount of air in the system.

Figure 2:
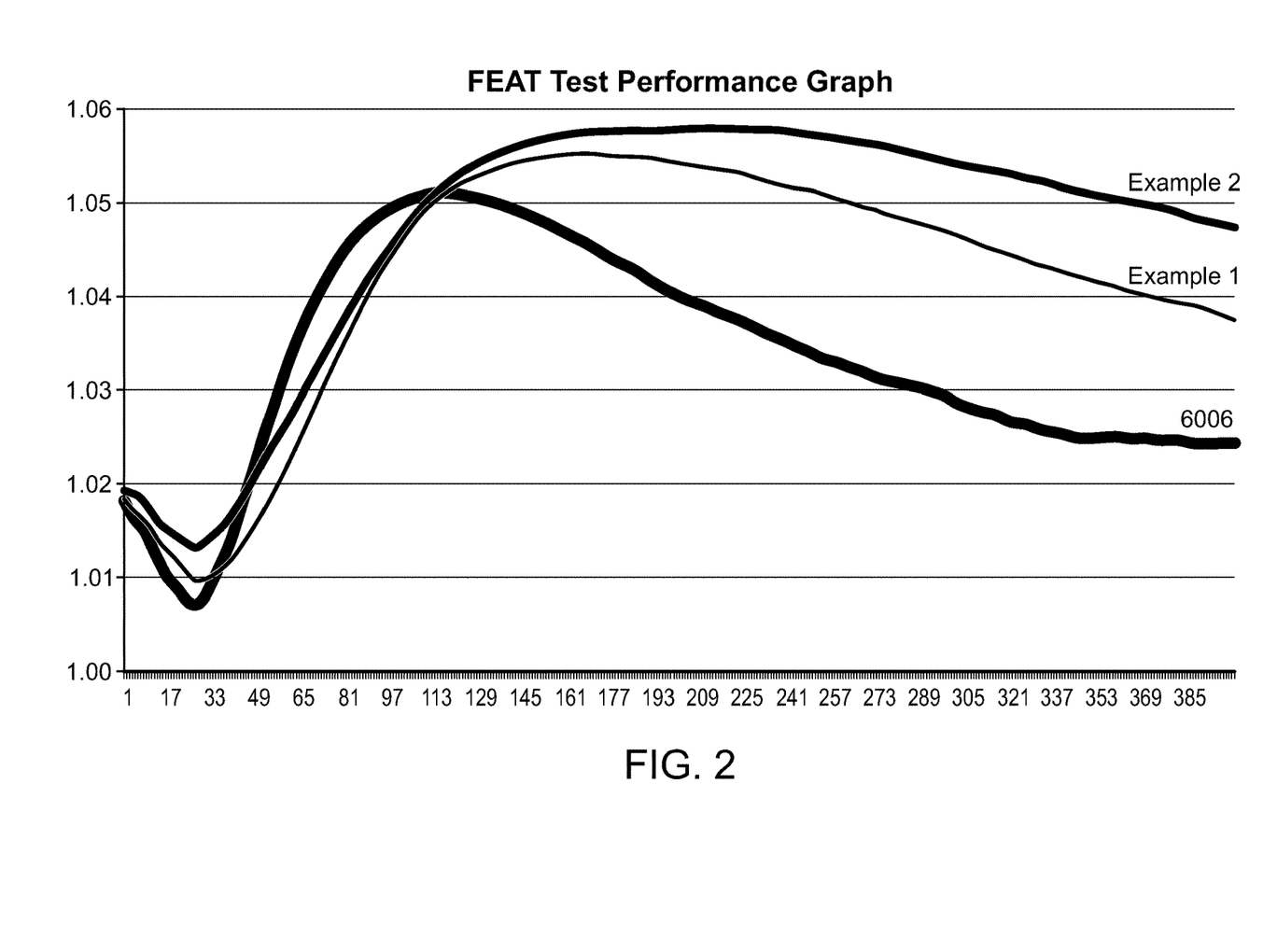
FIG. 2 plots the density of circulating black liquor over time following injection of three separate defoaming compositions into a FEAT testing apparatus, using the testing methodology and compositions described in the examples. (6006: FEnnotech6006, Example 1: 1.75% Janus, no surfactants, no thickener, specialty; Example 2: 2.3% Janus, no surfactants, no thickener, no salt, no specialty silicones, Dosage 200 μl, Fill height 15 cm, temperature 180 F, 82° C.).
Figure 3:
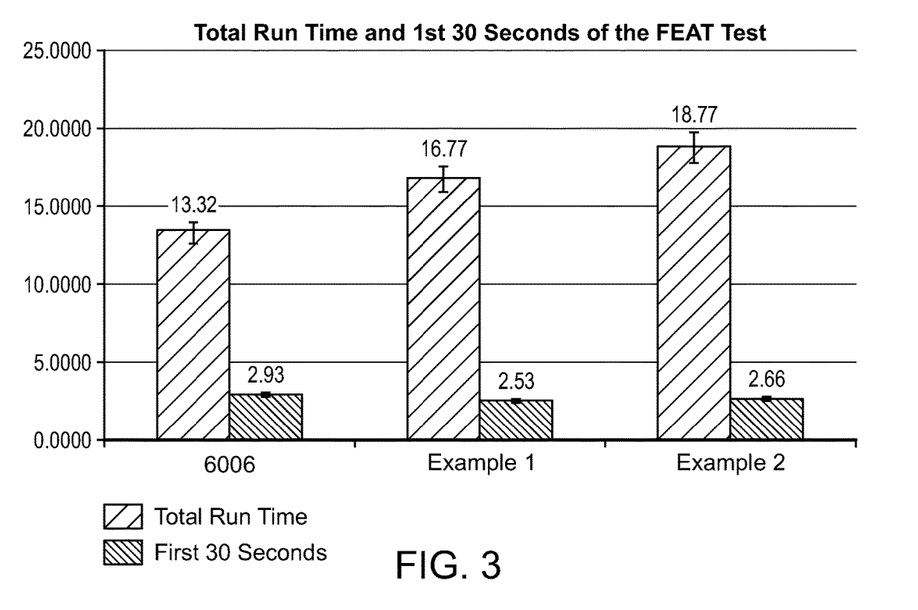
FIG. 3 is a bar chart depicting the 30 second knock down values for each of the three defoaming compositions in the FEAT test as described in the examples, and the total run time for each of defoaming compositions, derived from FIG. 2 using the methods described in the examples. (Dosage 200 μl, Fill height 15 cm, temperature 180 F, 82° C.).

The density over time was charted in what is known as a FEAT Result graph (FIG. 2), and the area under the curve was calculated from this graph and plotted on a bar graph reproduced as FIG. 3. The area under the curve for the first thirty seconds is known as the knockdown. The knockdown reflects how quickly the foam reacts to the defoamer; the higher the knockdown value, the faster the defoamer is acting on the system.

Defoamer decay can also be derived from the FEAT Result graph, because the density decreases as the defoamer begins to become less effective over time. The total run time is inversely proportional to the rate of decay observed for each product tested. The preferred product will typically exhibit less decay and the highest total run time.

Clear performance gains were seen with the addition of the Janus particles and the removal of the surfactants. Inventive Example 1 (1.75% Janus with specialty silicones, no surfactants) showed a 25.93% improvement in performance (calculated with the total area under the curve) compared to the Comparative Example 1. Inventive Example 2 (2.3% Janus, no specialty silicone, no surfactants, no salt) showed a 40.90% performance improvement over Comparative Example 1.

Throughout this application, various publications are referenced. The disclosures of these publications are hereby incorporated by reference in order to more fully describe the state of the art to which this invention pertains. It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method of defoaming or preventing foam in an industrial process stream comprising a step of adding to the industrial process stream a silicone-in-water emulsion stabilized by amphiphilic particles in an amount effective to defoam the stream, or to prevent foaming in the stream, wherein:
   a) the amphiphilic particles are fumed silica particles comprising at least one hydrophobic surface and at least one hydrophilic surface, and
   b) the emulsion comprises silicone emulsion droplets in a continuous aqueous phase with water and silicone emulsion droplets in a weight ratio from about 1:2 to about 1:7,
   wherein the silicone emulsion droplets comprise filled silicone (FS) and high viscosity linear dimethylsiloxane end capped by methyl (HVD), at a HVD:FS weight ratio from about 2:1 to about 10:1, wherein the filled silicone is a silica-in-dimethylsiloxane dispersion having weight ratio of dimethylsiloxane to silica, from about 4:1 to about 10:1 and dimethylsiloxane viscosity at 25° C. from about 100 cS to about 1000 cS, and the HVD has neat viscosity at 25° C. from about 10,000 cS to about 100,000 cS.

2. The method of claim 1, wherein the fumed silica particles having an average particle size of from about 0.5 microns to about 5 microns.

3. The method of claim 1, wherein the emulsion comprises from about 1% to about 3.5% of the amphiphilic particles based on the combined weight of water and amphiphilic particles in the emulsion.

4. The method of claim 1, wherein the emulsion further comprises one or more additives selected from a drainage enhancer, a corrosion inhibitor, a salt, and a biocide.

5. The method of claim 1, wherein the emulsion lacks a surfactant in an amount effective to stabilize the emulsion in the absence of the amphiphilic particles.

6. The method of claim 1, wherein the industrial process stream is a brown stock stream or black liquor stream in a paper making process.

* * * * *